United States Patent [19]
Zytka et al.

[11] Patent Number: 5,487,768
[45] Date of Patent: Jan. 30, 1996

[54] MINIENVIRONMENT FOR MATERIAL HANDLING

[76] Inventors: Donald J. Zytka, P.O. Box 666, Cascade, Colo. 80809; Peter G. Madden, 2190 Miller Dr., Longmont, Colo. 80501; Robert B. Eglinton, P.O. Box 221695, Carmel, Calif. 93922

[21] Appl. No.: 189,416

[22] Filed: Jan. 31, 1994

[51] Int. Cl.⁶ ................................................. B01D 46/00
[52] U.S. Cl. ...................... 55/385.2; 55/487; 55/DIG. 18
[58] Field of Search ............................... 55/385.2, 487, 55/467, 471, 486, DIG. 18, DIG. 29, DIG. 36

[56] References Cited

U.S. PATENT DOCUMENTS

| | | | |
|---|---|---|---|
| 3,273,323 | 9/1966 | Whitfield | 55/385.2 |
| 3,318,076 | 9/1967 | Baker | 55/DIG. 18 |
| 3,494,112 | 2/1970 | Deckas | 55/DIG. 18 |
| 3,895,570 | 7/1975 | Eagleson, Jr. | 55/DIG. 18 |
| 4,557,184 | 12/1985 | Orii et al. | 55/DIG. 18 |
| 4,927,438 | 5/1990 | Mears et al. | 55/385.2 |
| 5,083,558 | 1/1992 | Thomas et al. | 55/385.2 |
| 5,326,316 | 7/1994 | Hashimoto et al. | 55/385.2 |
| 5,336,128 | 8/1994 | Birdsong | 55/385.2 |

FOREIGN PATENT DOCUMENTS

| | | | |
|---|---|---|---|
| 61-262537 | 11/1986 | Japan | 55/385.2 |
| 62-186149 | 8/1987 | Japan | 55/385.2 |
| 63-180031 | 7/1988 | Japan | 55/385.2 |
| 63-259340 | 10/1988 | Japan | 55/385.2 |
| 64-46528 | 2/1989 | Japan | 55/385.2 |
| 9005549 | 5/1990 | WIPO | 55/385.2 |

OTHER PUBLICATIONS

Di Napoli, T., "Points to Consider When Applying Minienvironment Technology", *Cleanrooms*. vol. 8, No. 10, pp. 12–15 (Oct. 1993).

"Mini–Micro Environments by Liberty"]Advertisement, *Cleanrooms*, vol. 8, No. 10, back cover (Oct. 1993).

Grande, W., "Upgrading a Class 200 Fab Through Use of Manual–Access Microenvironments," *Microcontamination*, pp. 25–28 (Jan. 1993).

Gath, H., et al., "A Systematic Approach to Mini–Environment Complexity," 1993 Proceedings, Institute of Environmental Sciences, vol. 1, pp. 488–493 (1993).

Baechle, T., et al., "Certification and Acceptance of Mini Environment Air Systems," 1993 Proceedings, Institute of Environmental Sciences, vol. 1, pp. 544–549 (1993).

*Primary Examiner*—C. Scott Bushey

[57] ABSTRACT

A minienvironment provides a cleanroom-type environment by maintaining an ultra-filtered clean-air material handling area to minimize or eliminate the exposure of materials to harmful microcontaminants. The minienvironment includes an air flow generator assembly for directing air external to the minienvironment through a filter assembly into a material handling area. A diffuser redirects this filtered air flow over the material handling area in more than one direction to minimize or eliminate the exposure of any surfaces of materials in the handling area to harmful microcontaminants. The resulting continual outward flow of ultra-filtered air over this handling area prevents harmful microcontaminants in the air external to the minienvironment from directly entering the handling area and flushes out any harmful microcontaminants generated within the handling area. Furthermore, a worker may use an opening defined in the minienvironment to handle the materials in the handling area while viewing the handling area through a window panel. The minienvironment may also be easily linked and configured to form an assembly line for product manufacture and assembly where materials may be passed from one handling area to another.

29 Claims, 7 Drawing Sheets

MINIENVIRONMENT FOR MATERIAL HANDLING

BACKGROUND OF THE INVENTION

1. Field of the Invention

The present invention relates generally to the field of cleanroom-type environments for material handling and more particularly to the field of minienvironments for material handling.

2. Description of the Related Art

Manufacturing and assembly companies have built and maintained cleanrooms to provide a material handling environment with minimal airborne particulate contamination. Cleanrooms are needed for the manufacture and assembly of products where certain sensitive materials, such as semiconductor wafers, may be harmed by such contamination. The contamination mainly sought to be isolated from the material handling areas in a conventional cleanroom is not visible to the human eye and typically includes microcontaminant airborne particulates which are generally produced, for example, by outgassing of various materials such as sealants, paints, construction materials, etc., by mechanical motions required in the manufacturing or assembly process, or by humans who particularly during movement naturally generate contaminants into the air. Such contamination is commonly expressed with reference to the latest version of Federal Standard 209 which quantifies contamination per unit volume using Airborne Particulate Cleanliness Classes. Typically, companies strive to build and maintain anywhere from a Class 10 to a Class 1000 environment (according to the latest version of Federal Standard 209) in their cleanrooms, depending on the sensitivity of materials to be handled. In order to maintain a desired cleanliness class, conventional cleanrooms are built to provide unidirectional clean-air flow over areas where the material is being handled. It is to be appreciated that the air in a cleanroom is not entirely free of contamination. However, it is much less contaminated than other outside air. Cleanrooms are therefore generally built to recycle the air generated into and from the cleanroom. While conventional cleanrooms have proved to be effective in maintaining material handling areas of a desired cleanliness class, they nevertheless suffer many drawbacks.

One of the most severe drawbacks of conventional cleanrooms is the high cost incurred in building them. Cleanrooms are typically permanent structures which occupy at least one entire room in a building. To build a cleanroom, special equipment must be installed within the building to maintain a clean-air environment in the cleanroom at all times so that any harmful microcontamination generated within the cleanroom does not affect sensitive material being handled. Such special equipment typically includes special air conditioning units, large air flow generators to provide adequate air flow and recycling, air ducts to direct air for delivery and recycling, and large filtration systems which filter recycled air from the air flow generator and which typically occupy nearly an entire wall in the room for horizontal air flow or, alternatively, nearly an entire ceiling in the room for vertical air flow. The equipment for the cleanroom must be specially installed in the building and typically occupies other rooms and areas within and about the building. Furthermore, the cleanroom itself must be specially prepared, for example, to minimize or eliminate any outgassing by walls, ceilings, equipment, furniture, etc., in the cleanroom and to minimize or prevent any outside airflow from leaking into the cleanroom as any outside air not recycled through the equipment will typically be filled with harmful contamination. Because of this special equipment, its required installation, and the preparation involved for a conventional cleanroom, the cost alone of building a cleanroom is exorbitant.

Another serious drawback is the amount of time, effort, and expense required to maintain an environment having a desired cleanliness class in the cleanroom. The clean-air environment must be maintained in the cleanroom at all times so that any harmful microcontamination within the cleanroom is flushed out and does not affect sensitive materials being handled. In the event contamination within the cleanroom does harm materials being handled, product manufacturing or assembly systems must be shut down to avoid further contamination of sensitive materials. The entire cleanroom may also have to be cleaned after such incidents. Such a slow recovery of the cleanroom's use only prevents more products from being manufactured and assembled. Consequently, the cleanroom requires extensive operator, parts and equipment control, and continual maintenance and cleaning in hopes of avoiding contamination incidents as much as possible. Such necessary maintenance only further exacerbates the cost of a cleanroom.

Still another drawback of the cleanroom is the restrictions and burdens endured by cleanroom workers. Since humans typically generate contaminants at all times, cleanroom workers are required to wear goggles, gloves, and special garments which effectively cover up their entire self, including their head and feet, to prevent their naturally generated contamination from harming materials inside the cleanroom. These garments must be specially made to minimize the workers' generation of contamination into the cleanroom, and thus are confining for many people. Furthermore, the workers' behavior within the cleanroom must be restricted as their movement only increases the generation of harmful microcontaminants from themselves despite the special garments. Consequently, working in a cleanroom for extensive periods of time can prove to be overly uncomfortable and restrictive for many people.

Aside from the burdens endured by the workers, a separate clean-air room must be built at the entrance of the cleanroom so that the workers may change into their special attire. A clean-air environment must also be maintained in this changing room to avoid outside contamination from entering the cleanroom, for example, when the workers are entering into and exiting from the changing room or cleaning room and when the workers are changing into their special garments. Typically, anywhere from a Class 10 to a Class 1000 environment must be maintained in the changing room, depending again on the sensitivity of the material being handled and the desired cleanliness of the cleanroom. Accordingly, the cost for building and maintaining a cleanroom becomes even further exacerbated by the required cost for building and maintaining the changing room and for the special garments worn by workers.

Thus, what is needed is a way of providing for a cleanroom-type environment for material handling without requiring the extensive cost typically incurred in building and maintaining a cleanroom. What is also needed is a way of providing for a cleanroom-type environment for material handling which allows for a quicker, cheaper, and easier recovery from contamination incidents as compared to that required for the conventional cleanroom. What is further needed is a more comfortable and less restrictive environment for workers who handle materials in a cleanroom-type environment.

BRIEF SUMMARY OF THE INVENTION

The present invention advantageously overcomes the above drawbacks typically incurred in building and maintaining a cleanroom-type environment for material handling. The high costs typically incurred in building and maintaining cleanrooms has been minimized to only the cost of constructing and maintaining one or more minienvironments in accordance with the present invention. Furthermore, the use of one or more minienvironments in accordance with the present invention saves the total cost required for building and maintaining a clean-air changing room for the conventional cleanroom and for buying and cleaning the special garments required to be worn by workers inside the conventional cleanroom.

The minienvironment in accordance with the present invention is also portable and may be fully operational to provide for an ultra-filtered clean-air material handing environment in a Class 100,000 or higher environment. Accordingly, the minienvironment in accordance with the present invention overcomes the restriction of having to build a permanent conventional cleanroom inside a building, thus providing much more flexibility in choosing where to manufacture and assemble products. Workers who use the minienvironment in accordance with the present invention may also work more comfortably without having to wear goggles or confining special garments and without being overly restricted in their behavior or movements. Furthermore, as compared to the recovery measures required for conventional cleanrooms, recovery measures for the minienvironment in accordance with the present invention, whether alone or linked with other units, is much quicker and easier and less costly.

In accordance with the present invention, an apparatus for providing a filtered-air environment for material handling includes a frame assembly and a filtered-air delivery assembly for delivering filtered air to a material handling area defined by the frame assembly. The filtered-air delivery assembly includes an air flow generator assembly for directing air to the material handling area from an area external to the material handling area, and a filter assembly for filtering the air directed from the external area to the material handling area by the air flow generator assembly. The apparatus also includes an air flow redirector configured within the frame assembly for redirecting the air filtered by the filter assembly over the material handling area.

Also in accordance with the present invention, a system for providing a filtered-air environment for material handling includes a plurality of frame assemblies coupled to one another where each of the frame assemblies defines a material handling area. The system also includes a filtered-air delivery assembly for delivering filtered air to the material handling area defined by a first one of the frame assemblies where the filtered-air delivery assembly includes an air flow generator assembly for directing air to the material handling area defined by the first frame assembly from an area external to the material handling area defined by the first frame assembly, and a filter assembly for filtering the air directed by the air flow generator assembly from the external area to the material handling area defined by the first frame assembly.

While the above advantages of the present invention have been described, other attendant advantages, objects, and uses of the present invention will become evident to one of ordinary skill in the art based on the following detailed description of the present invention with reference to the accompanying drawings.

BRIEF DESCRIPTION OF THE DRAWINGS

The present invention is illustrated by way of example and not limitation in the figures of the accompanying drawings in which like references indicate similar elements and in which:

FIG. 5b illustrates an enlarged cross-sectional view of the air-seal illustrated in FIG. 5a;

FIG. 6b illustrates an enlarged cross-sectional view of the air-seal bracket illustrated in FIG. 6a;

FIG. 7b illustrates an enlarged cross-sectional view of the air-seal flange illustrated in FIG. 7a;

FIG. 7c illustrates another enlarged cross-sectional view of the air-seal flange illustrated in FIG. 7a;

DETAILED DESCRIPTION

A specific embodiment or embodiments in accordance with the present invention for a minienvironment for material handling is described. In the following description, numerous specific details are set forth such as specific dimensions, materials, etc., in order to provide a thorough understanding of the present invention. It will be evident, however, to one of ordinary skill in the art that the present invention may be practiced without these specific details. In other instances, well-known materials, products, equipment, etc., have not been described in particular detail so that the present invention is not unnecessarily obscured. Furthermore, all references to cleanliness classes in this detailed description are in accordance with the Airborne Particulate Cleanliness Classes as defined by the latest version of Federal Standard 209 as of the filing date of this patent application.

Figure 1:
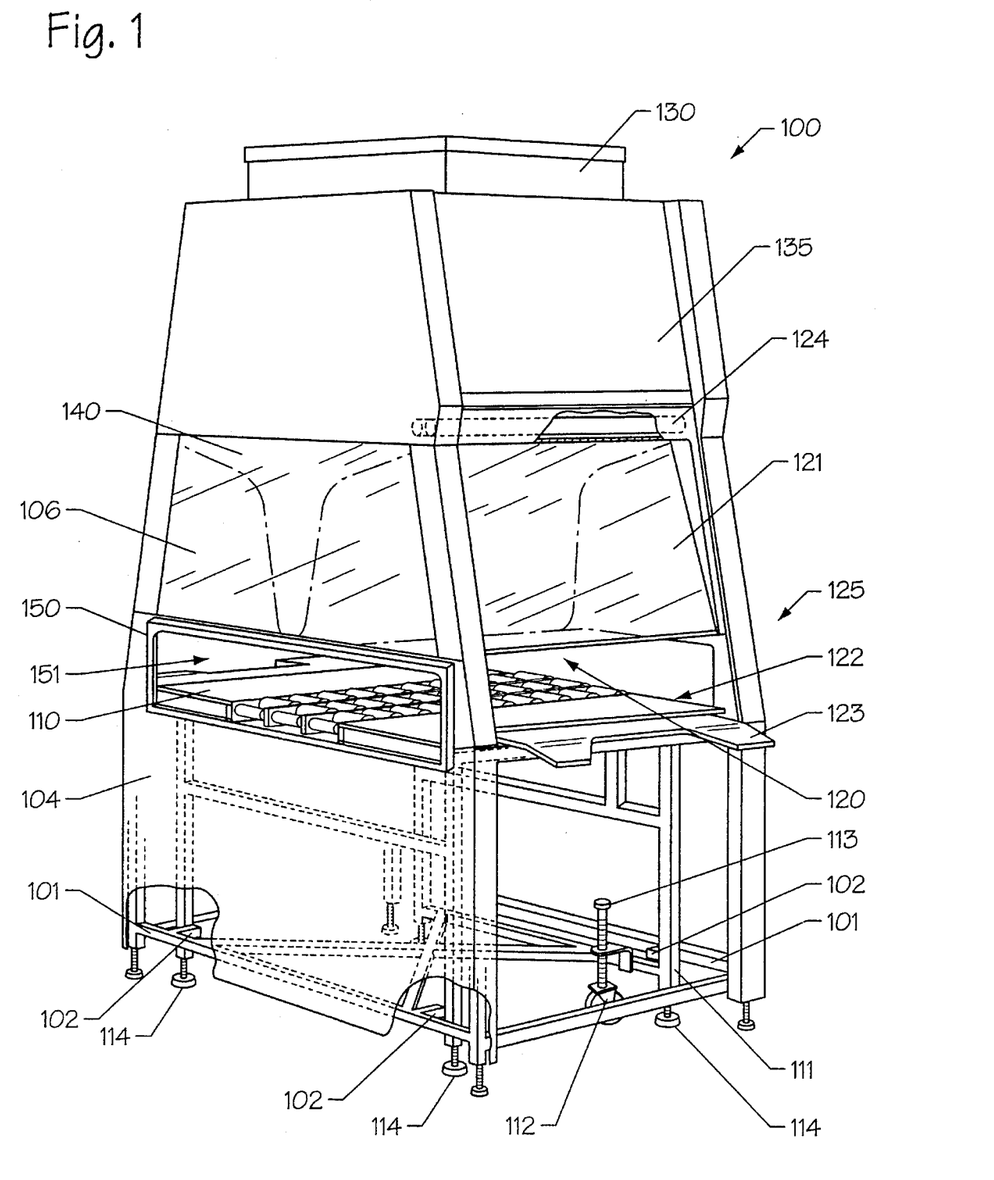
FIG. 1 illustrates a perspective view of the primary side of the minienvironment in accordance with the present invention.

FIG. 1 illustrates a perspective view of the primary side of the minienvironment in accordance with the present invention. In FIG. 1, a portable, free-standing, and independently operating minienvironment 100 provides for a cleanroom type environment for a work station or material handling area 120 defined within minienvironment 100. Table assembly 110 is couched within minienvironment 100 for supporting any materials, tools, equipment, robotics assemblies, etc. used for manufacturing or assembling products in material handling area 120. It is to be understood that material handling as used in this detailed description is not to be construed as being limited to handling sensitive materials which may be harmed by microcontaminants but also includes, for example, automated tooling, manual tooling, assembly, manufacture, material processing, material conveyance, etc. While in a preferred embodiment material handling area 120 is approximately 36 inches by approximately 52 inches, minienvironment 100 may be built such that material handling area 120 has other dimensions, for example, depending on the desired amount of area needed for the manufacture and assembly of a specific product. In using minienvironment 100, a worker may comfortably sit at operator interface 125 of minienvironment 100 and handle materials within material handling area 120 with his or her hands using opening 122 while resting his or her arms on arm rest 123. Arm rest 123 may be adjustable. Opening 122 may also be positioned in minienvironment 100 so as to allow a worker to stand in a comfortable position while handling materials in material handling area 120. The worker can easily view material handling area 120 through window panel 121 with the aid of lighting 124. As will be discussed in further detail below, the worker only has to wear gloves despite the exposure of material handling area 120 by opening 122 to the open air external to minienvironment 100. Preferably, the gloves extend to the elbow of the worker's arms. If minienvironment 100 is to reside in a conventional cleanroom, though, the worker will also have to wear suitable gowning as required to maintain the cleanliness for that cleanroom. A robotics assembly, equipment, machine, etc., may also be positioned external to minienvironment 100 to handle materials within material handling area 120. It is to be appreciated that window panel 121 may be reconfigured to accommodate the use of tooling, scopes, process equipment, etc., as desired.

Figure 2:
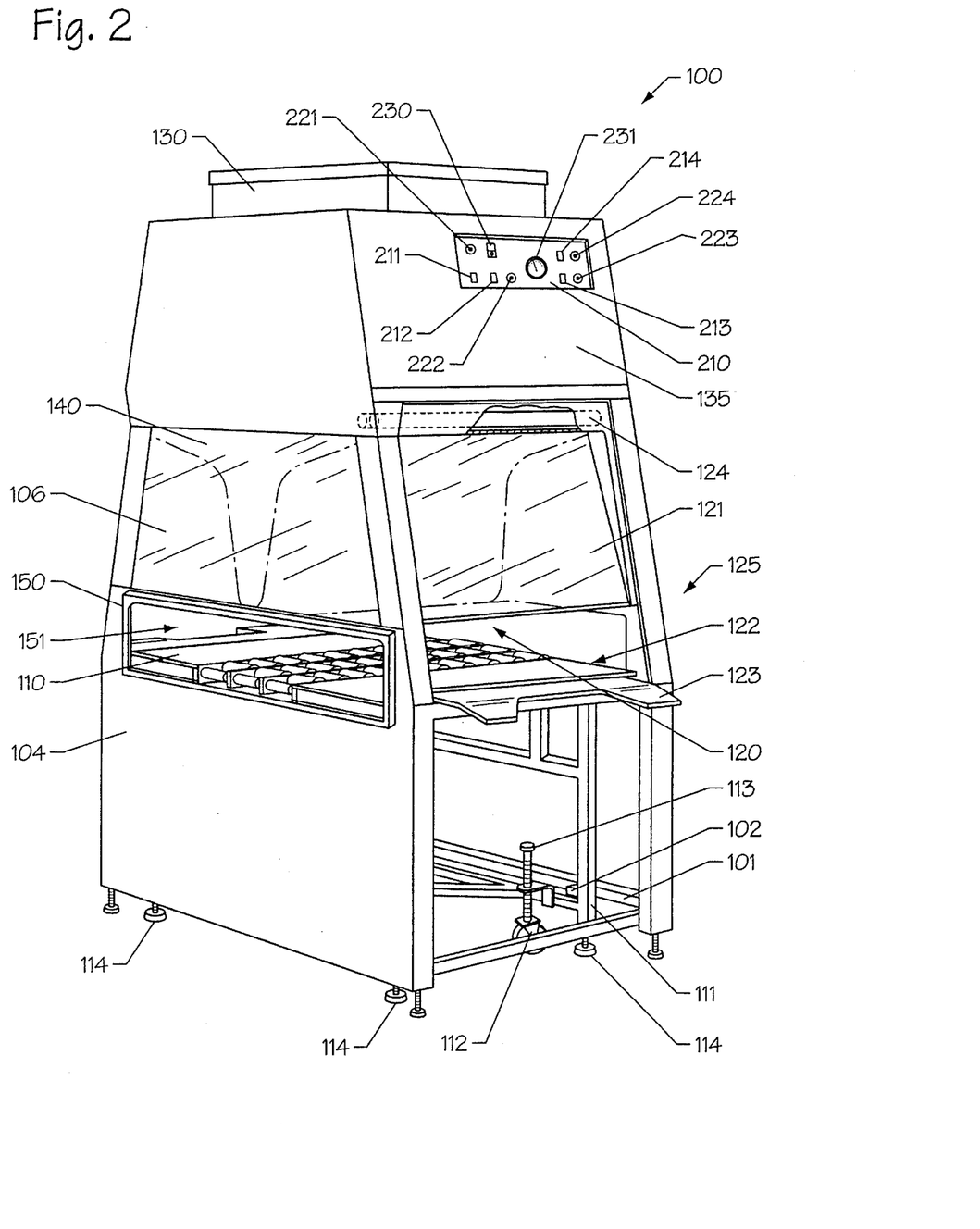
FIG. 2 illustrates a perspective view of the secondary side of the minienvironment in accordance with the present invention.

Minienvironment 100 also has a secondary side as illustrated in FIG. 2 which illustrates a perspective view of the secondary side of minienvironment 100 in accordance with the present invention. It is to be appreciated material handling area 120 may be accessed and used from either the primary side, the secondary side, or both simultaneously. The outer appearance and structure of the secondary side, which is opposite the primary side, substantially mirrors the primary side of minienvironment 100 with the exception of control panel 210 on the secondary side of minienvironment 100. Accordingly, the detailed description pertaining to the primary side of minienvironment 100 as illustrated in FIG. 1 similarly applies to its secondary side as illustrated in FIG. 2.

Figure 3:
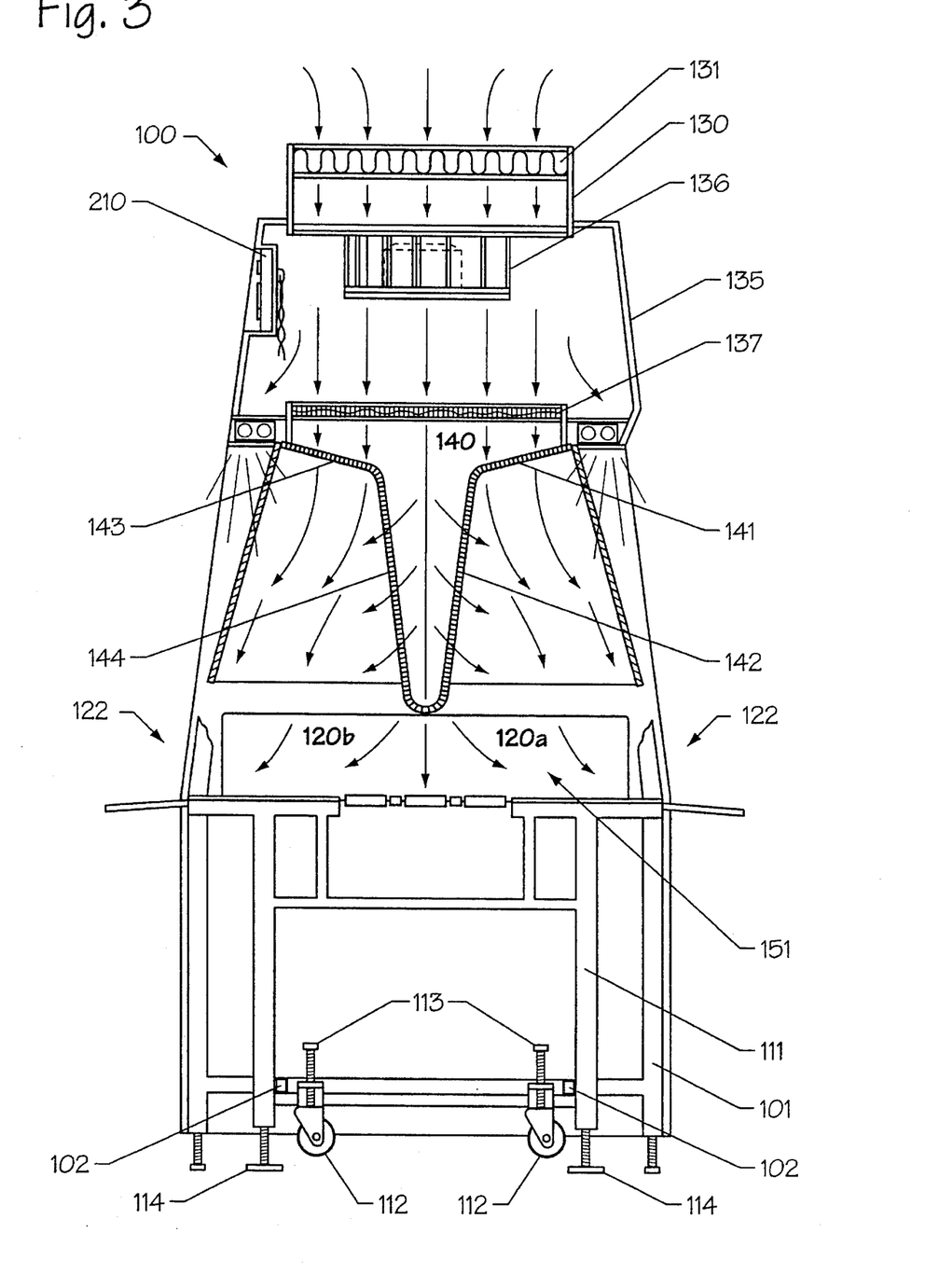
FIG. 3 illustrates a side view of the minienvironment in accordance with the present invention.

Overall, minienvironment 100 is configured to provide a steady and constant flow of ultra-filtered air through material handling area 120 whether minienvironment 100 is used in a non-cleanroom environment, such as standard factory conditions, as a replacement for a conventional cleanroom or is used in a conventional cleanroom as an enhancement for that cleanroom. In doing so, minienvironment 100 has an air flow generator assembly 136 within enclosure 135, as illustrated in FIG. 3, which creates a directed air flow through filter 137 into material handling area 120 (areas 120a and 120b of FIG. 3) using the air external to minienvironment 100. The air external to minienvironment 100 may be that of a conventional cleanroom having, for example, a Class 100 environment or of a non-cleanroom environment having, for example, a Class 100,000 or higher environment. This external air is directed through prefilter housing 130 where it is prefiltered by prefilter 131 to remove contaminants, for example gross contaminants. This prefiltered air flow is then directed by air flow generator assembly 136 through filter 137 within enclosure 135. Filter 137 removes contaminants from the prefiltered air flow which may include, for example, smaller contaminants which could not be prefiltered by prefilter 131. Consequently, the resulting ultra-filtered air flow is directed through diffuser 140 to create a multi-directional flow of ultra-filtered air over material handling area 120.

With this constant multi-directional flow of ultra-filtered air flowing at least in the substantially horizontal and substantially vertical directions over area 120, substantially all surfaces of sensitive material in material handling area 120 are prevented from becoming exposed to harmful microcontaminants within area 120. Indeed, any harmful microcontaminants within area 120 will get flushed out of area 120 as a result of this constant multi-directional flow of ultra-filtered air which is directed over area 120 and outward into areas external to area 120, for example through openings 122 and 151 and through open portions of table assembly 110 into the air external to minienvironment 100. Such harmful microcontamination can result, for example, from mechanical motions necessary for manufacturing or assembly in area 120 or possibly from the worker's natural generation of contaminants while handling materials in area 120. Furthermore, any harmful microcontaminants in the air external to minienvironment 100 are prevented from entering material handling area 120 because of this continual outward flow of ultra-filtered air. Minienvironment 100 thus provides an ultra-filtered clean-air material handling environment.

Figure 4:
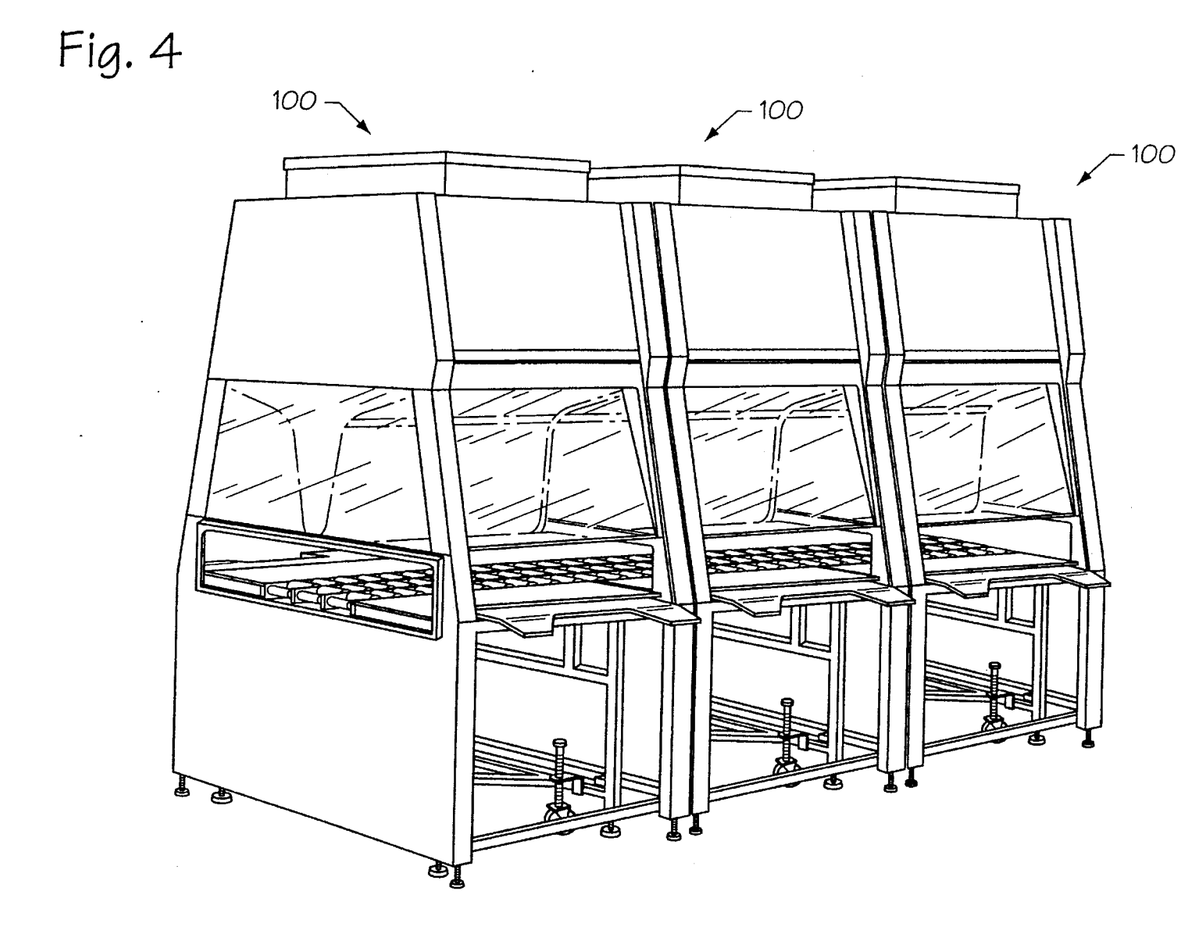
FIG. 4 illustrates an example set-up of a plurality of minienvironments in accordance with the present invention.

Minienvironment 100 may be used as a stand-alone cleanroom-type environment or, alternatively, may be linked with other units, for example other minienvironments, to create a linear assembly line for product manufacturing or assembly. Depending on the product being manufactured or assembled, minienvironment 100 may be linked with any number of a plurality of other cleanroom-type units, such as other minienvironments as illustrated in FIG. 4, to form a clean-air linear assembly line where sensitive materials remain in an ultra-filtered clean-air environment while being passed between linked units. In linking minienvironment 100 to another unit, connector 150 which surrounds opening 151, as illustrated in FIGS. 1, 2, and 4, may be used to provide an air-sealed connection between minienvironment 100 and the other unit such that materials may be passed through opening 151 between material handling area 120 and a material handling area of the other unit without becoming exposed to harmful microcontaminants in the air external to the linear assembly line. Furthermore, minienvironment 100 may be easily replaced with another minienvironment in the assembly line, for example, if minienvironment 100 were to malfunction or otherwise need replacement within its linear assembly line. Minienvironment 100 may also be easily reconfigured in a linear assembly line, for example, so that minienvironment 100 can be used with other units in different arrangements for different manufacturing or assembly line purposes.

The structure of minienvironment 100 will now be described in more detail. It is to be appreciated though that the specific materials, dimensions, finishes, etc. described below are merely provided as examples for a better understanding of the present invention. Indeed, the specific materials, dimensions, finishes, etc., which may be used to construct minienvironment 100 in accordance with the present invention may depend upon any one or a number of factors including the intended use of the minienvironment, the desired cleanliness class to be provided and maintained within the minienvironment, the material being handled in the minienvironment, the sensitivity of this material being handled, the size of the material, the process involved in using this material to manufacture a product, the size of the product, etc. Preferably, the specific material or materials used to construct minienvironment 100 have been tested to determine whether and to what extent the materials outgas or otherwise naturally generate microcontaminants. Whether a material is used or not may depend upon the desired cleanliness class of the environment to be maintained in minienvironment 100. This cleanliness class may in turn depend upon the sensitivity of the material to be handled using minienvironment 100. The materials used in the construction of minienvironment 100, and particularly those exposed to material handling area 120, may also be and preferably are treated, for example by electropolishing the material (e.g., stainless steel), and/or finished, for example with an epoxy powder coating or a polyurethane coating, to minimize or eliminate the material's or materials' propensity to spread microcontaminants into material handling area 120. Indeed, any outgassing or microcontaminant generation from the materials used to construct minienvironment 100 may only defeat its purpose of providing an ultra-filtered clean-air material handling area 120. Examples of materials which may be used include, for example, cold rolled steel, stainless steel, and aluminum.

As illustrated in FIG. 1, minienvironment 100 is mainly supported by frame 101 which serves as the skeleton for the minienvironment's structure. While in a preferred embodiment frame 101 contains cold rolled steel, other materials may be used. Frame 101 supports various structural components of minienvironment 100. A side panel 106 is attached to frame 101 on opposite sides of minienvironment 100. Each panel 106 in a preferred embodiment is made of a transparent panel of polycarbonate or conductive polycarbonate, is approximately 3 millimeters thick, and has a bottom length of approximately 54.5 inches, a top length of approximately 46.8 inches, and a vertical height of approximately 24.5 inches. It is to be understood, though, that each side panel 106 may be made of other materials and may have other dimensions. A lower side cover 104 is also attached to frame 101 on opposite sides of minienvironment 100. In a preferred embodiment each lower side cover is made of cold rolled sheet steel and has a bottom length of approximately 57.6 inches, a top length of approximately 54.2 inches, and a vertical height of approximately 41.8 inches. It is to be understood, though, that each lower side cover 104 may be made of other materials and may have other dimensions. Openings 151 are preferably defined within each lower side cover 104 for reasons which will follow. While in a preferred embodiment openings 151 have a length of approximately 47.5 inches and a height of approximately 6.5 inches, other dimensions for openings 151 may also be used.

The remaining features illustrated in FIG. 1 will now be described with further references to FIG. 3 which illustrates a side view of minienvironment 100 in accordance with the present invention. In operation, air flow generator assembly 136 generates a directed air flow into material handling area 120 from the air external to minienvironment 100. This external air may be that of a conventional cleanroom having, for example, a Class 100 environment when minienvironment is to be used as an enhancement for that cleanroom. Alternatively, this external air may be that of a non-cleanroom environment having, for example, a Class 100,000 or higher environment when minienvironment 100 is to be used as a replacement for a cleanroom. The external air is directed through prefilter housing 130 where it is prefiltered by prefilter 131 to remove contaminants. While in a preferred embodiment prefilter housing 130 is made of cold rolled sheet steel and its dimensions are approximately 24 inches in length by approximately 24 inches in width by approximately 7.25 inches in height, other materials and dimensions may be used. Prefilter housing 130 is preferably configured such that prefilter 131 is accessible for inspection, cleaning, and replacement. Furthermore, prefilter housing 130 is configured such that external air flows through the top of housing 130. It is to be understood, though, that prefilter housing 130 may be configured to house prefilter 131, for example, such that external air flows only through portions of the sides of prefilter housing 130 for filtering by prefilter 131 or such that external air flows through both top and portions of the sides of prefilter housing 130 for filtering by prefilter 131.

Prefilter 131 filters the air in prefilter housing as it is directed into enclosure 135 by air flow generator assembly 136. In a preferred embodiment prefilter 131 includes two filters for filtering contaminants having a size of 0.5 microns or greater: one having a 30 percent efficiency and the other having an 85 percent efficiency for reasons expressed below. It is to be understood though that prefilter 131 may be only one filter or may comprise any number of filters having various filtering efficiencies for contaminants having various sizes. Prefilter 131 is preferably configured in housing 130 such that substantially all air directed through prefilter housing 130 is directed through prefilter 131. In this connection, a closed cell gasket or other sealing agent may be used. Preferably, this sealing agent does not emit any harmful microcontaminants.

The prefiltered air flow directed in enclosure 135 is further directed by air flow generator assembly 136 through filter 137 within enclosure 135. While in a preferred embodiment enclosure 135 is made of cold rolled sheet steel and has dimensions of approximately 16 inches in vertical height and approximately 46 inches in length by approximately 37 inches in width in its lower portion, other materials and dimensions may be used. Enclosure 135 is preferably configured such that air flow generator assembly 136 and filter 137 are accessible for inspection, cleaning, and replacement. Air flow generator assembly 136 within enclosure 135 comprises a fan for directing air from the area external to minienvironment 100 through prefilter 131 and filter 137 into material handling area 120. While in a preferred embodiment the fan of air flow generator assembly 136 is a backward curved impeller rated at 2800 CFM, it is to be appreciated various other types of fans may be used in generating the air flow. Preferably, the operating speed of the fan used to generate the air flow may be adjustable without the use of shims or belts so as to minimize the amount of maintenance required for minienvironment 100. Furthermore, the fan is preferably properly balanced to minimize vibration of minienvironment 100 as any vibration of materials used to construct minienvironment 100 may adversely affect the manufacturing or assembly process.

Filter 137 filters the prefiltered air in enclosure 135 to produce an ultra-filtered air flow as it is directed toward material handling area 120 by air flow generator assembly 136. Here, filter 137 removes contaminants from the prefiltered air flow. These contaminants may include, for example, smaller contaminants which could not be prefiltered by prefilter 131. In a preferred embodiment, filter 137 is a high efficiency ULPA filter which filters contaminants having a 0.1 micron or greater size with an efficiency of 99.999 percent. Filter 137 may have other efficiencies for contaminants of other sizes and may include any number of filters having various efficiencies for contaminants of various sizes. In order to preserve the useful life of filter 137, prefilter 131 preferably filters larger contaminants from the directed air flow as pointed out above so that filter 137 has to filter only the smaller contaminants from the directed air flow. It is to be appreciated that enclosure 135, air flow generator assembly 136, and filter 137 are configured such that substantially all air directed into enclosure 135 has been filtered by prefilter 131 and is directed through filter 137. In this connection a gel seal or other sealing agent may be used. Preferably, this sealing agent does not emit any harmful microcontaminants. It is also to be appreciated that the specific configuration of the air flow generator assembly in conjunction with the filtering system described above may be varied in providing an ultra-filtered air flow to material handling area 120. For example, the air flow generator assembly may direct the external air through only one filter system having any number of filters such as those used for prefilter 131 and/or filter 137.

The resulting ultra-filtered air flow from filter 137 is directed through diffuser 140 to create a multi-directional flow of ultra-filtered air over material handling area 120. Diffuser 140 preferably redirects substantially all of the ultra-filtered air flow over material handling area 120 in multiple directions, including both the substantially vertical and substantially horizontal directions over material handling area 120. It is to be appreciated that the continual flow of ultra-filtered air over the surfaces of materials in area 120 prevents harmful microcontaminants in-area 120 from settling on or otherwise affecting those surfaces of the materials. While diffuser 140 may be configured to direct the ultra-filtered air flow in only one direction over area 120, for example in either the substantially vertical or the substantially horizontal direction, diffuser 140 is preferably configured to provide for a multi-directional ultra-filtered air flow. If diffuser 140 were configured to provide only uni-directional air flow over area 120, the ultra-filtered air may not flow over some surfaces of materials in area 120, thus increasing the possibility of those surfaces becoming affected by harmful microcontaminants within area 120. Such uni-directional air flow may be sufficient, though, to satisfy the cleanliness requirements for certain materials which are to be handled in minienvironment 100.

Configuring diffuser 140 for multi-directional air flow advantageously provides for a constant flow of ultra-filtered air over substantially all surfaces of the materials being handled in area 120. In this manner, the exposure of materials in area 120 to harmful microcontaminants is minimized or eliminated as this constant flow of ultra-filtered air prevents the surfaces of materials from becoming directly exposed to harmful microcontaminants within area 120. The constant multi-directional flow of ultra-filtered air may also serve to flush out harmful microcontaminants within area 120 into the air external to minienvironment 100. This is so because the continual flow of ultra-filtered air is redirected by diffuser 140 over area 120 and outward toward the areas external to area 120, for example through openings 122 and 151 and through open portions of table assembly 110 into the air external to minienvironment 100. Such harmful microcontamination can result, for example from mechanical motions necessary for manufacturing or assembly in area 120 or possibly from the worker's natural generation of contaminants while handling materials in area 120. Furthermore, any harmful microcontaminants in the air external to minienvironment 100 are prevented from entering material handling area 120 because of this continual outward flow of ultra-filtered air. Minienvironment 100 thus provides an ultra-filtered clean-air material handling environment.

In a preferred embodiment diffuser 140 has a perforated sheet of stainless steel which, generally, has been molded to contain four main surfaces 141, 142, 143, and 144 and to divide material handling area 120 into material handling area 120a on the primary side of minienvironment 100 and into material handling area 120b on the secondary side of minienvironment 100. Diffuser 140 is configured to provide multidirectional air flow over material handling areas 120a and 120b of area 120 as illustrated in FIG. 3. Here, the ultra-filtered air flow directed through filter 137 by air flow generator assembly 136 flows through a top opening of diffuser 140, which in this embodiment has dimensions of approximately 36.1 inches in length by approximately 34.5 inches in width, and is then forced through the molded, perforated sheet of diffuser 140 into at least two directions over each area 120a and 120b. Here, a first surface 141 of diffuser 140 extends at a horizontal angle for approximately 14.5 inches over the top of material handling area 120a and directs the ultra-filtered air flow substantially vertically over material handling area 120a. A second surface 142 of diffuser 140 extends at a vertical angle for approximately 16.5 inches through a middle portion of material handling area 120 and directs the ultra-filtered air flow substantially horizontally over material handling area 120a. In creating surfaces 141 and 142, the perforated sheet of diffuser 140 has been molded with a curve having a radius of approximately 2.0 inches such that surfaces 141 and 142 are angled to provide for their respective substantially vertical and substantially horizontal ultra-filtered air flow over material handling area 120a. The opposite side of diffuser 140 which has surfaces 143 and 144 substantially mirrors the side having surfaces 141 and 142. Here, a third surface 143 and a fourth surface 144 of diffuser 140 direct the ultra-filtered air flow from filter 137 substantially vertically and substantially horizontally, respectively, over material handling area 120b. In creating the opposite sides of diffuser 140 for material handling areas 120a and 120 b, the perforated sheet of diffuser 140 has been molded at its lowest point with a curve having a radius of approximately 1.5 inches such that surfaces 142 and 144 are angled to provide for their respective substantially horizontal ultra-filtered air flow over material handling areas 120 a and 120 b.

It is to be appreciated that diffuser 140 directs the ultra-filtered air flow from the top and interior portions of each material handling area 120 a and 120 b outward toward the areas external to area 120, for example through openings 122 and 151 and through open portions of table assembly 110 into the air external to minienvironment 100. Because diffuser 140 redirects the continual flow of ultra-filtered air in this manner, any harmful microcontaminants in the air external to minienvironment 100 are prevented from directly entering material handling areas 120 a and 120 b. Furthermore, the continual flow of ultra-filtered air over material handling areas 120 a and 120 b may serve to flush out harmful microcontaminants generated within material handling areas 120 a and 120 b into the air external to minienvironment 100. Such harmful microcontamination can result, for example from mechanical motions necessary for manufacturing or assembly in areas 120 a and 120 b or possibly from the worker's natural generation of contaminants while handling materials in areas 120 a or 120 b. It is also to be appreciated that because of the configuration of diffuser 140 in a preferred embodiment where the ultra-filtered air flow is directed from the middle of material handling area 120 and outward toward the primary and secondary sides, the exposure of one material handling area, for example, area 120 a to microcontaminants does not affect the cleanliness of the other material handling area 120 b.

While in a preferred embodiment the openings in the perforated sheet of diffuser 140 are staggered, 1/16 inch in diameter, and positioned on 1/8 inch centers, it is to be understood that other sizes, spacings, and patterns of openings may also be used. Furthermore, diffuser 140 may be and preferably is pre-cleaned and fully electropolished to a uniform overall finish with maximum brightness, luster, and reflectivity on all surfaces so as to minimize or eliminate any frosting shadows, streaks, erosion, stains, water spots and irregular patterns in the finish. This electropolishing may also serve to minimize or eliminate the propensity of diffuser 140 to outgas or generate contaminants into material handling areas 120 a and 120 b. It is to be understood, though, that while diffuser 140 has been described above with regard to the specific embodiment illustrated in the drawings, other diffuser configurations may be used for directing ultra-clean air flow over and about material handling area 120. For example, diffuser 140 may be reconfigured such that its middle portion is moved closer to the primary side or the secondary side so as to provide additional space for material handling area 120 b or 120 a, respectively. The diffuser may also be reconfigured so as to provide only one material handling area 120. Here, the diffuser may be configured to be "one-sided" and located, for example, on the secondary side of minienvironment 100 to provide the multi-directional flow of ultra-filtered air over one material handling area 120 toward the primary side. Alternatively, the diffuser may be removed so as to provide only a uni-directional flow of ultra-filtered air from filter 137 in the substantially vertical direction over area 120. As noted above, the uni-directional flow of ultra-filtered air may satisfy the cleanliness requirements for certain materials.

In using minienvironment 100 for product manufacturing and assembly, a worker may comfortably sit at operator interface 125 of minienvironment 100 and handle materials within material handling area 120 with his or her hands using opening 122 while resting his or her arms on arm rest 123. Arm rest 123 may be configured such that the worker may adjust arm rest 123 at a desired angle and height for the worker's comfort. It is to be appreciated that opening 122 completely exposes material handling area 120 to the air external to minienvironment 100. A glove box may be used in place of opening 122. However, since minienvironment 100 provides a continual flow of ultra-filtered air outward into the areas external to minienvironment 100 as discussed above, a glove box is not necessary as the ultra-filtered air flow over material handling area 120 is preferably strong enough not only to prevent harmful microcontaminants in the outside air from directly entering area 120 through opening 122 but also to prevent the worker from dragging harmful microcontaminants into area 120. Indeed, opening 122 is more preferable than a glove box as opening 122 is not as restrictive to the worker in handling materials within area 120. Furthermore, a glove box may only prove to be too cumbersome and impractical for a worker in manipulating equipment, tooling, etc., for some manufacturing or assembly processes. With opening 122 the worker may more freely move his or her hands into, out of, and about area 120 and only has to wear gloves to minimize or eliminate the generation of harmful microcontamination from the worker within area 120. Preferably, the gloves extend to the elbow of the worker's arm to better protect area 120 from harmful microcontaminants generated by the worker. If minienvironment 100 is to reside in a conventional cleanroom, though, the worker will also have to wear suitable gowning as required to maintain the cleanliness for that cleanroom. Opening 122 may also be positioned in minienvironment 100 so as to allow a worker to stand in a comfortable position while handling materials in material handling area 120. A robotics assembly, equipment, machine, etc., may also be positioned external to minienvironment 100 to handle materials within material handling area 120. While in a preferred embodiment, opening 122 is approximately 30 inches in length and approximately 9 inches in height, other dimensions for opening 122 may be used.

The worker may use a transparent window panel 121, which is configured on both the primary and secondary sides of minienvironment 100, for viewing material handling area 120 while handling materials there. Each window panel 121 has an approximately 0.25 inch thick safety laminated glass panel having a height of approximately 21.8 inches and a width of approximately 29.0 inches. Other thicknesses, materials, and dimensions for window panel 121 may also be used, though. Window panel 121 preferably has a 95 percent or better transmittance rating and also preferably has an anti-static or conductive coating on its inside and an anti-glare coating its outside. The anti-static or conductive coating may advantageously serve to reduce or eliminate electrostatic build-up so that harmful microcontaminants do not cling to window panel 121 but rather are flushed out from minienvironment 100 by the continual flow of ultra-filtered air. The anti-glare coating may advantageously serve to reduce or eliminate any glare from window panel 121, for example as a result of lighting 124 or external lighting. Furthermore, window panel 121 is preferably angled, for example at an approximately 9 degree angle from a vertical axis, for the worker's comfort in viewing material handling area 120 while working. Accordingly, the worker may comfortably view a well-lighted material handling area 120 through window panel 121. It is to be appreciated that window panel 121 may be reconfigured to accommodate tooling, process equipment, etc. as desired depending on the manufacturing or assembly process to be conducted using minienvironment 100. Such reconfiguration may be necessary, for example, when robotics assembly or process equipment is positioned external to minienvironment 100 to handle materials within material handling area 120. Furthermore, window panel 121 may be reconfigured, for example, with scopes to facilitate material handling by the worker for some manufacturing or assembly processes.

As compared to a conventional cleanroom, then, the workers in using minienvironment 100 as a replacement for a cleanroom are no longer burdened by having to wear goggles or confining special garments which effectively cover up their entire self, including their head and feet. Furthermore, the workers' behavior and movements are not as restricted as was required in the cleanroom. Rather, workers may now more comfortably sit or stand in a typically controlled room having a Class 100,000 or higher environment outside minienvironment 100 while handling materials in minienvironment 100.

The portable, free-standing, independently operating minienvironment may also be easily controlled using control panel 210, as illustrated on the secondary side of minienvironment 100 in FIG. 2. Control panel 210 contains power switches 211, 212, 213, and 214 in order to provide for a main power supply, fan power supply, and lighting power for lighting 124 on both the secondary side and the primary side of minienvironment 100, respectively. Control panel 210 also provides respective circuit breakers 221, 222, 223, and 224 for these power supplies. An air flow speed adjuster 230 and a pressure gauge 231 for monitoring the amount of pressure maintained in enclosure 135 are also provided on control panel 210 to control and monitor the operation of air flow generator assembly 136. It is to be appreciated that the operating speed of air flow generator assembly 136 may be adjusted using air flow speed adjuster 230 without the use of shims or belts so as to minimize the amount of maintenance required for minienvironment 100. While not shown in the drawings, control panel 210 is appropriately connected to the necessary electrical power supplies, equipment, etc., as is known in the art so that minienvironment 100 may operate as indicated.

A maintenance technician or worker may also have easier access to material handling area 120 than that provided with opening 122 by using window panel 121. While in a preferred embodiment window panel 121 is configured with a hinge at its top so that it may be opened from the bottom, it may be configured differently to allow further access to area 120. Window panel 121 may be equipped with shocks attached between the frame of window panel 121 and frame 101 of minienvironment 100 to assist in opening and closing window panel 121 and to hold window panel 121 in an open position. Accordingly, the technician or worker may easily load, prepare, clean, adjust, or remove the necessary materials, tools, equipment, robotic assemblies, etc., required for the manufacture and assembly of a specific product or products using minienvironment 100.

This window panel configuration may also advantageously serve to provide for a quicker recovery from a contamination incident within area 120 as compared to that required for a conventional cleanroom. Here, the maintenance technician or worker may simply open window panel 121 to remove the source of harmful microcontaminants from area 120 and/or to clean area 120. The multi-directional flow of ultra-filtered air will then flush out any existing harmful microcontaminants from material handling area 120, thus allowing a quick and full recovery of material handling area 120 to its desired cleanliness level. It is to be appreciated that because of the configuration of diffuser 140 where the ultra-filtered air flow is directed from the middle of material handling area 120 and outward toward the primary and secondary sides, window panel 121 on one side of minienvironment 100 may be opened to further expose one material handling area, for example area 120 $a$, to the outside air without affecting the desired cleanliness level of the other material handling area 120 $b$. In this manner, one side of minienvironment 100 may still be used for material handling while window panel 121 on the other side is opened, for example, to allow for tooling maintenance. It is also to be appreciated that area 120 has a very limited size as compared to a conventional cleanroom which occupies an entire room. Accordingly, recovering from a contamination incident in minienvironment 100 proves to be much quicker and easier and less costly than recovering from such an incident in a conventional cleanroom.

Minienvironment 100 may also be conveniently used with any one of a variety of table assemblies, for example, depending on the manufacturing and assembly requirements for a specific product. While table assembly 110 may be permanently or detachably connected to minienvironment 100, it is preferably detached or not connected to minienvironment 100 so that different types of table assemblies may be easily placed within minienvironment 100 when needed. For example, a table assembly with a conveyor system and material handling platform may be used. Alternatively, a table assembly with a simple or complex material handling platform may also be used. As a further example, a table assembly made for accommodating robotics assemblies, various equipment or tools, custom handling platforms, etc. may be used. Regardless of the type of table assembly 110 used in minienvironment 100, table assembly 110 preferably has openings or some type of perforated surface so as to allow the continual flow of ultra-filtered air directed by diffuser 140 to flow outward from area 120 through table assembly 110 into the air external to minienvironment 100. Furthermore, table assembly 110 is preferably not attached to minienvironment 100 so as to isolate any vibration of the minienvironment 100 from affecting table assembly 110 and to isolate any vibration of table assembly 110 from affecting minienvironment 100. Any vibration caused by and friction created between minienvironment 100 and table assembly 110 may generate harmful microcontaminants into area 120 and may adversely affect the manufacturing or assembly process.

In a preferred embodiment, table assembly 110 has a supporting frame 111 to which a set of four wheels 112 may be attached near the four lower corners of frame 111. Wheels 112 are coupled to frame 111 by threaded rods 113. In this manner, table assembly 110 may be lowered to rest directly on its legs 114 by appropriately rotating threaded rods 113 in one direction. Table assembly 110 may also be raised from this position for transport on wheels 112 by appropriately rotating threaded rods 113 in the opposite direction. Accordingly, table assembly 110 may be easily transported when desired, and, optionally, may be put to rest squarely on legs 114. By removing one lower side cover 104 and appropriate portions of frame 101 of minienvironment 100, then, table assembly 110 may be easily transported into and out from minienvironment 100. Furthermore, frame 101 of minienvironment 100 in this embodiment has four studs 102 extending inward toward table assembly 110 and positioned over portions of frame 111. As a result of lowering or raising table assembly 110, then, minienvironment 100 may be lowered or raised, respectively. Here, when table assembly 110 is being raised, its frame 111 pushes up on studs 102 of frame 101 causing minienvironment 100 to be raised along with table assembly 110. Similarly, when table assembly 110 is being lowered, studs 102 which rest on portions of frame 111 cause minienvironment 100 to be lowered along with table assembly 110.

While the configuration of the lower structural support for table assembly 110 and minienvironment 100 in a preferred embodiment has been described above, it is to be appreciated that various other lower support configurations may be used to provide for lower support for and/or transportation of table assembly 110 and/or minienvironment 100. For example, table assembly 110 and/or minienvironment 100 may be supported by a simple four-legged frame with or without wheels at the bottom of each leg. The lower support structure of table assembly 110 and/or minienvironment 100 may also be configured for transport in other ways, for example, by use of a forklift, hydraulic carts, etc. Preferably, the lower support structure of table assembly 110 and minienvironment 100 are configured so that both may be moved at once, for example, as in the embodiment described above where the lower structural support for table assembly 110 is configured not only for transport of table assembly 110 but also for transport of minienvironment 100 while table assembly 110 is couched within minienvironment 100. Regardless of the configuration of the lower support structure used for table assembly 110 and minienvironment 100, table assembly 110 and minienvironment 100 preferably rest squarely on a flat surface, for example the floor or a raised platform, while in use so as to avoid any movement of table assembly 110 and minienvironment 100 during manufacturing or assembly. Accordingly, any wheels which are used to transport table assembly 110 and/or minienvironment 100 should be restricted from causing table assembly 110 and/or minienvironment 100 to move while in use, for example, by blocking the wheels using wedges, by locking the wheels from movement, by detaching the wheels from table assembly 110 and/or minienvironment 100, or by raising the wheels from the supporting surface such as in the embodiment discussed above.

Minienvironment 100 may be used as a stand-alone cleanroom-type environment for material handling described above. Alternatively, it may also be linked or configured with other minienvironments as illustrated in FIG. 4 which shows an example set-up of a plurality of minienvironments in accordance with the present invention. Minienvironment 100 may thus be used with other minienvironments to form a clean-air linear assembly line where sensitive materials remain in an ultra-filtered clean-air environment while being passed through openings 151 between linked minienvironments. In this manner, any number of minienvironments may be linked in a variety of different arrangements, for example, depending upon the product to be manufactured, the material to be handled, or the manufacturing and assembly process to be implemented. In linking one minienvironment 100 to another, connector 150 which surrounds opening 151 may be used to provide an air-sealed connection between two minienvironments such that materials may be passed through opening 151 from the material handling area 120 of one minienvironment to the material handling area 120 of another minienvironment without becoming exposed to harmful microcontaminants in the air external to the assembly line. While minienvironment 100 is described as being capable of being linked to other minienvironments, it is to be appreciated that other cleanroom-type units or even non-cleanroom type units may be linked with minienvironment 100 depending, for example, on the specific manufacturing or assembly process to be employed using minienvironment 100.

Figure 5A:
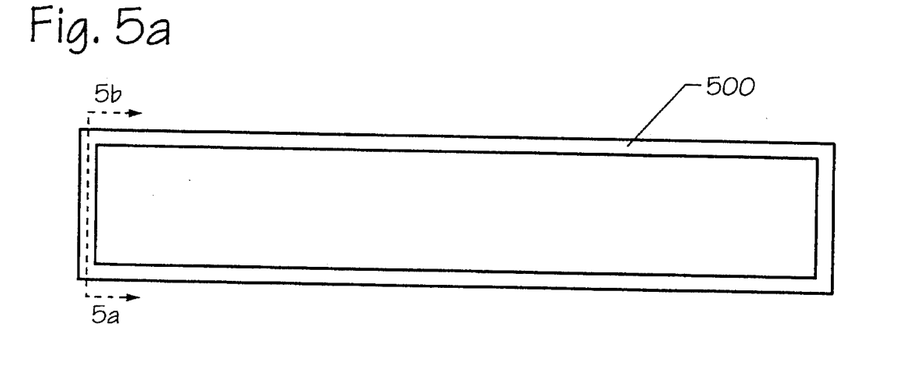
FIG. 5a illustrates an air-seal for providing an air-sealed connection between a minienvironment and another unit in accordance with the present invention.
Figure 5B:
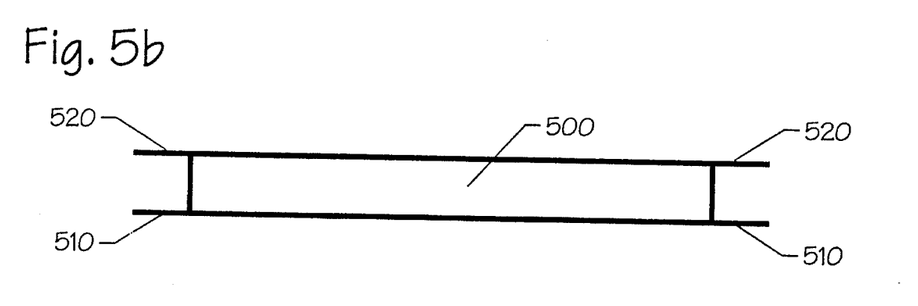
Figure 6A:
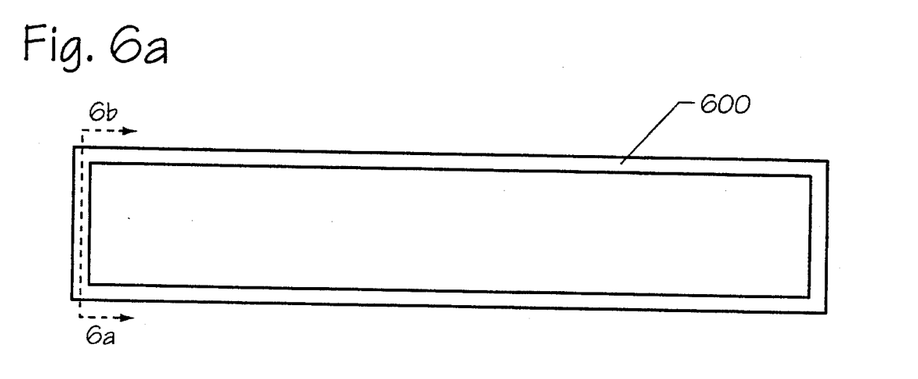
FIG. 6a illustrates an air-seal bracket for providing an air-sealed connection between a minienvironment and another unit in accordance with the present invention.
Figure 6B:
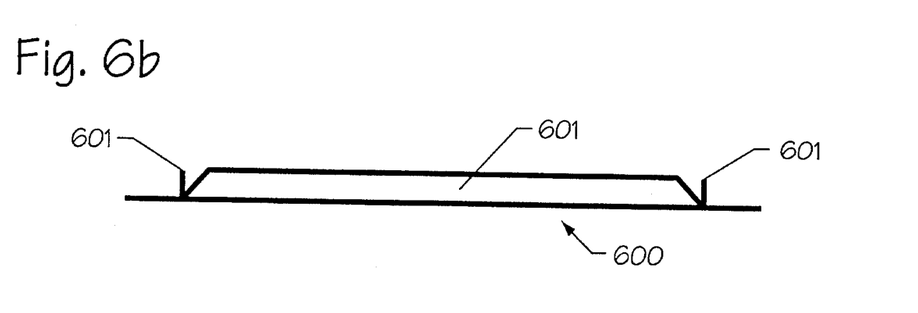
Figure 7A:
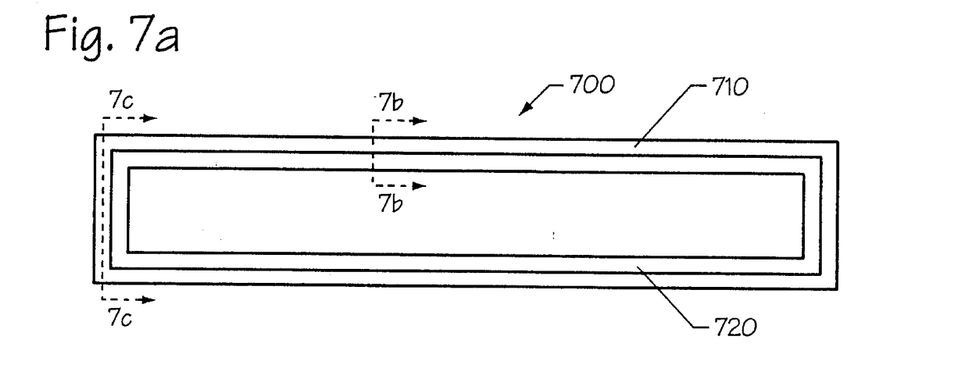
FIG. 7a illustrates an air-seal flange for providing an air-sealed connection between a minienvironment and another unit in accordance with the present invention.
Figure 7B:
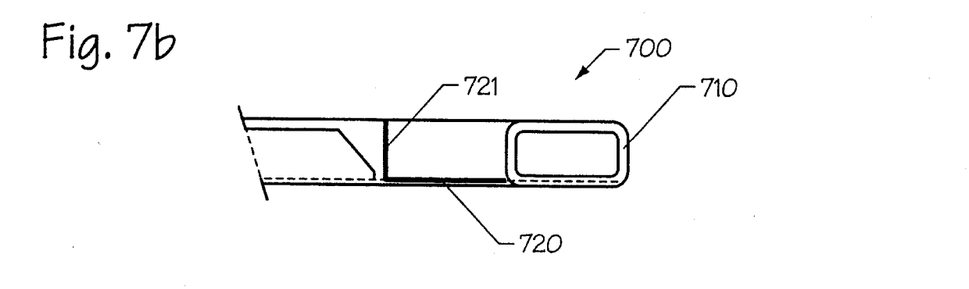
Figure 7C:
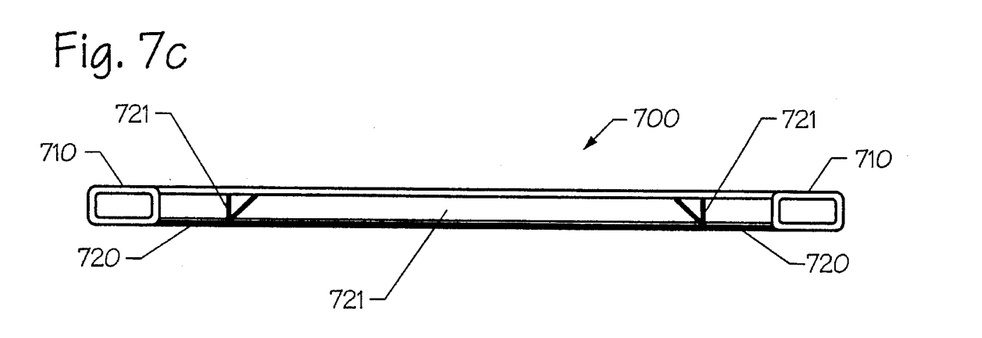

In a preferred embodiment connector 150, as illustrated in FIGS. 1 and 2, includes an air-seal 500, as illustrated in FIGS. 5a and 5b, an air-seal bracket 600, as illustrated in FIGS. 6a and 6b, and an air-seal flange 700, as illustrated in FIGS. 7a, 7b, and 7c. Air-seal 500, as illustrated in FIG. 5a, is rectangular and made of polyurethane. Preferably, air-seal 500 does not outgas harmful microcontaminants and has a clean surface free from oils, waxes, lubricants, etc. so as to minimize or eliminate the exposure of materials to harmful microcontaminants. Air-seal 500 has outer dimensions of approximately 50.0 inches in length by approximately 9.0 inches in height, has inner dimensions of approximately 48.0 inches in length by approximately 7.0 inches in height, and has a thickness of approximately 0.75 inches. FIG. 5b illustrates an enlarged cross-sectional view of the entire air-seal 500. As illustrated in FIG. 5b, the outer perimeter of air-seal 500 includes a lip 510 along the perimeter of an interior side of air-seal 500 and a lip 520 along the perimeter of an exterior side of air-seal 500.

Air-seal bracket 600, as illustrated in FIG. 6a, is rectangular and made of cold rolled steel. Air-seal bracket 600 has outer dimensions of approximately 50.0 inches in length by approximately 9.0 inches in height and has inner dimensions of approximately 48.3 inches in length by approximately 7.3 inches in height. FIG. 6b illustrates an enlarged cross-sectional view of the entire air-seal bracket 600. As illustrated in FIG. 6b, air-seal bracket 600 includes lips 601 having a thickness of approximately 0.4 inches along its inner perimeter.

Air-seal flange 700, as illustrated in FIG. 7a, is rectangular and made of cold rolled steel. Air-seal flange 700 includes an outer rectangular frame 710 having outer dimensions of approximately 52.2 inches in length by approximately 11.2 inches in height, having inner dimensions of approximately 50.2 inches in length by approximately 9.2 inches in height, and having a thickness of approximately 0.4 inches. Air-seal flange 700 also includes an inner rectangular frame 720 which outlines the interior of outer frame 710. The outer dimensions of inner frame 720 are approximately the same as the inner dimensions of outer frame 710 whereas the inner dimensions of inner frame 720 are approximately 48.2 inches in length by approximately 7.2 inches in height. FIG. 7b illustrates an enlarged cross-sectional view of outer frame 710 and inner frame 720 of air-seal flange 700. As illustrated in FIG. 7b, inner frame 720 has lips 721 along its inner perimeter. FIG. 7c illustrates an enlarged cross-sectional view of the entire air-seal flange 700.

Figure 8A:
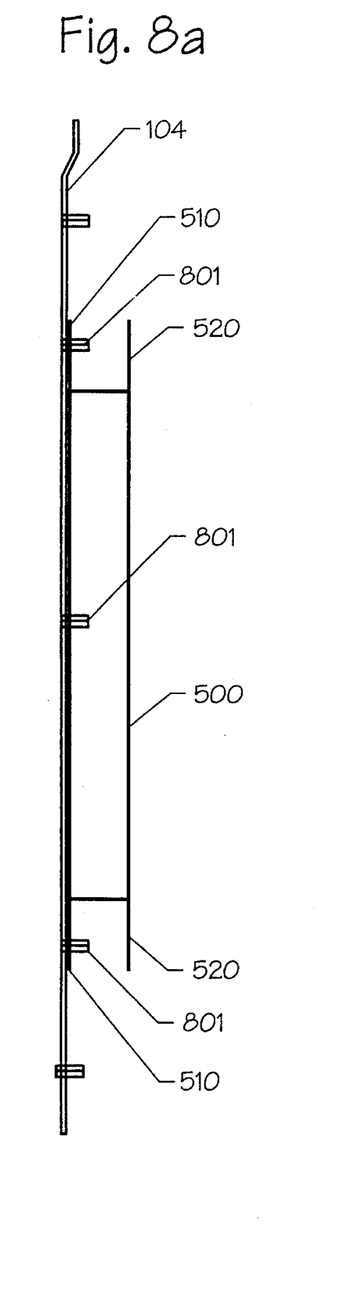
FIG. 8a illustrates a cross-sectional view of the connection of the air-seal illustrated in FIGS. 5a and 5b to a minienvironment in accordance with the present invention.
Figure 8B:
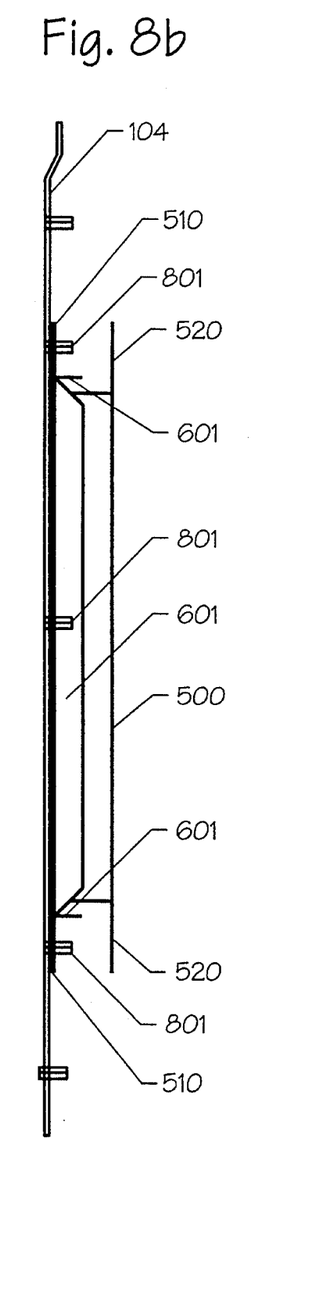
FIG. 8b illustrates a cross-sectional view of the connection of the air-seal bracket illustrated in FIGS. 6a and 6b to the minienvironment illustrated in FIG. 8a in accordance with the present invention.
Figure 8C:
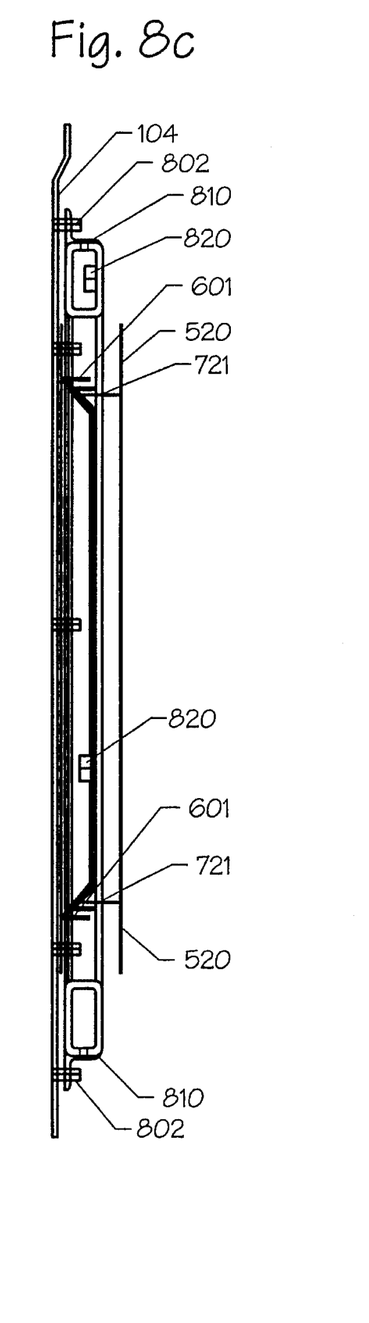
FIG. 8c illustrates a cross-sectional view of the connection of the air-seal flange illustrated in FIGS. 7a, 7b, and 7c to the minienvironment illustrated in FIG. 8b in accordance with the present invention.

Air-seal 500, air-seal bracket 600, and air-seal flange 700 are used to form connector 150 as illustrated in FIGS. 8a, 8b, and 8c to provide for an air-sealed connection between minienvironment 100 and another unit. FIG. 8a illustrates a cross-sectional view of the connection of air-seal 500 to side cover 104 of minienvironment 100. It is to be appreciated that air-seal 500 is to surround opening 151 in side cover 104. As illustrated in FIG. 8a, studs 801 in side cover 104 are inserted through holes in lip 510 in connecting air-seal 500 to side cover 104. Next, as illustrated in FIG. 8b, studs 801 are inserted through holes in air-seal bracket 600 to connect air-seal bracket 600 to side cover 104. In doing so, lip 520 of air-seal 500 is pulled inward, toward the center of air-seal 500, such that air-seal bracket 600 surrounds the outer perimeter of air-seal 500 between lips 510 and 520. It is to be appreciated that air-seal 500 is flexible and that lip 520 may "spring back" to its original form once air-seal bracket 600 is in place, as illustrated in FIG. 8b. Once air-seal 500 and air-seal bracket 600 are in place, nuts may be used over studs 801 to secure air-seal 500 and air-seal bracket 600 to side cover 104.

Air-seal flange 700 is then to be connected to side cover 104 using air-seal springs 810, as illustrated in FIG. 8c. Each air-seal spring 810 is made of cold rolled steel, is approximately 48.2 inches in length, and has an L-shaped cross section where each leg of the "L" is approximately 0.4 inches wide. One leg of the "L" in each air-seal spring 810 is screwed or bolted to the top or bottom of outer frame 710 of air-seal flange 700. Studs 802 in side cover 104 are then inserted through holes in the other leg of the "L" in each air-seal spring 810 to connect air-seal flange 700 to side cover 104. In doing so, lip 520 of air-seal 500 is again pulled inward, toward the center of air-seal 500, such that air-seal flange 700 surrounds the outer perimeter of air-seal 500 between lips 510 and 520. It is to be appreciated that lips 721 in air-seal flange 700 are to fit between lips 601 in air-seal seal bracket 600 and the outer perimeter of air-seal 500. Once air-seal flange 700 is in place, nuts may be used over studs 802 to secure air-seal flange 700 to side cover 104.

Having formed connector 150 to surround opening 151 in side cover 104 of minienvironment 100, another minienvironment or other unit may be easily connected to minienvironment 100 using screws or bolts. Here, such screws or bolts may be used to attach the side of another unit to outer frame 710 of air-seal flange 700 using nutserts 820, as illustrated in FIG. 8c. When these bolts or screws are tightened, connector 150 creates an air-sealed connection between opening 151 of minienvironment 100 and another opening in the now-connected unit, thus minimizing or eliminating the exposure of harmful contaminants to materials being passed through such openings.

While air-seal 500, air-seal bracket 600, air-seal flange 700, and air-seal springs 810 have been described above as having specific dimensions and materials, it is to be understood that other dimensions and materials may be used for these items. It is also to be understood that while air-seal 500, air-seal bracket 600, and air-seal flange 700 have been described above as being connected to side cover 104 and to another unit using air-seal springs 810, studs, nuts, screws, and/or bolts, various other connectors may be used in connecting air-seal 500, air-seal bracket 600, and air-seal flange 700 to side cover 104 and to the other unit. Also, while the above description describes the use of air-seal bracket 600, air-seal flange 700, and air-seal springs 810 in conjunction with air-seal 500 to provide for an air-sealed connection, other items may be used to secure air-seal 500 between minienvironment 100 and the unit to be connected. Lastly, while the configuration of connector 150 in a preferred embodiment has been described, it is to be appreciated that other configurations may be used to link one minienvironment to another unit. Preferably, the configuration used provides for an air-sealed connection between each minienvironment so as to minimize or eliminate the exposure of harmful microcontaminants to materials being passed between minienvironments.

Because of the linked configuration of minienvironments, recovering from various incidents fatal to the use of an assembly line is quicker, easier, and cheaper than that required for conventional cleanrooms. Here, each linked minienvironment configured in an assembly line may be easily disconnected from and replaced by another minienvironment in the assembly line by simply disconnecting a minienvironment 100 from a minienvironment or minienvironments in the assembly line, raising the disconnected minienvironment on wheels 112 as discussed above, moving the disconnected minienvironment out of the assembly line, and reconnecting another minienvironment into the assembly line. Thus, a minienvironment that, for example, is malfunctioning, contains harmful microcontaminants, must be inspected or reconfigured, etc. may be easily replaced within the assembly line by another minienvironment.

This modular assembly line of linked minienvironments may also prevent any harmful microcontaminants within one minienvironment from spreading to other minienvironments, as these harmful microcontaminants, as discussed above, will be flushed out of the contaminated minienvironment and will be prevented from directly entering the material handling areas of the other minienvironments. Preferably, though, the air flow speed of the minienvironments surrounding the contaminated minienvironment may be adjusted using the air flow speed adjuster 230 on control panel 210 to provide a greater outward flow of ultra-filtered air in the surrounding minienvironments as compared to that of the contaminated minienvironment. In this manner, any harmful microcontaminants in a minienvironment will be prevented from entering the surrounding minienvironments, for example, through openings 151. Furthermore, as discussed above, window panel 121 may also be opened to allow a worker to clean the material handling area in a minienvironment. Accordingly, recovery of an assembly line of linked minienvironments becomes only limited by the amount of time it takes to either clean a contaminated minienvironment or to replace a minienvironment in the assembly line. As compared to the recovery measures required for conventional cleanrooms, then, recovery of an assembly line of linked minienvironments proves to be much quicker and easier and less costly.

The preferred embodiment or embodiments in accordance with the present invention has thus been described. The present invention thus advantageously overcomes many of the drawbacks of using conventional cleanrooms for handling sensitive materials in product manufacturing or assembly. The high costs typically incurred in building and maintaining cleanrooms has been minimized to only the cost of constructing and maintaining one or more minienvironments in accordance with the present invention. For example, the cost of buying and installing the special equipment required to maintain a conventional cleanroom has been replaced with the reduced cost for the construction materials, filters, air flow generator assembly, etc., to build one or more minienvironments in accordance with the present invention. Furthermore, the use of one or more minienvironments in accordance with the present invention saves the total cost required for building and maintaining a clean-air changing room for the conventional cleanroom and for buying and cleaning the special garments required to be worn by workers inside the conventional cleanroom.

The minienvironment in accordance with the present invention is also portable and may be fully operational to provide for an ultra-filtered clean-air material handing environment in a Class 100,000 or higher environment. Accordingly, the minienvironment in accordance with the present invention overcomes the restriction of having to build a permanent conventional cleanroom inside a building, thus providing much more flexibility in choosing where to manufacture and assemble products. Workers who use the minienvironment in accordance with the present invention may also work more comfortably without having to wear goggles or confining special garments and without being overly restricted in their behavior or movements. Furthermore, as compared to the recovery measures required for conventional cleanrooms, recovery measures for the minienvironment in accordance with the present invention, whether alone or linked with other units, proves to be much quicker and easier and less costly.

While the above description of a minienvironment has been described with reference to specific materials, quantities, finishes, dimensions, configurations, etc., for the minienvironment illustrated in the drawings, it is to be appreciated that other materials, quantities, finishes, dimensions, configurations, etc., may be used to construct and use minienvironment 100 in accordance with the present invention.

Furthermore, it is to be appreciated that while minienvironment 100, alone or in combination with other minienvironments or other units, has been described with regard to its use for the manufacture and assembly of various products, minienvironment 100, alone or in combination with other minienvironments or other units, may be used for other purposes as well. For example, minienvironment 100 may be used for testing purposes where various materials sensitive to harmful microcontamination are involved.

It is also to be appreciated that while minienvironment 100 has been described above as having both a primary side and a secondary side allowing two material handling areas to be used simultaneously, other configurations for minienvironment 100 may be used. For example, minienvironment 100 may be configured to have only a primary side allowing only one material handling area to be used.

It is still further to be appreciated that while minienvironment 100 has been described above as having its own air flow generator assembly 136 with filters 131 and 137, minienvironment 100 may be configured differently to receive an ultra-filtered air flow from other sources. For example, a directed air flow from an air flow generator assembly external to the minienvironment may be supplied to minienvironment using a suitable duct. In this configuration, the directed air flow may be filtered in minienvironment 100 and redirected through diffuser 140 to create the desired multidirectional flow of ultra-filtered air over material handling area 120. Alternatively, this directed air flow may be filtered outside of minienvironment 100 such that minienvironment 100 receives a flow of ultra-filtered air and redirects it through diffuser 140 over material handling area 120. In this alternative configuration, though, the duct is preferably tested and/or treated to ensure it does not generate harmful contaminants into material handling area 120. The configurations above may also be used where minienvironments are linked in an assembly line. Here, one or more sources of directed air flow or of ultra-filtered directed air flow may be connected to one or more linked minienvironments to provide for a clean assembly line.

While the detailed description in accordance with the present invention has been set forth above with regard to the best mode and preferred embodiment or embodiments contemplated by the inventors, it is to be appreciated that the present invention is not limited to the above embodiment or embodiments and that various modifications may be made to the above embodiment or embodiments without departing from the broader spirit or scope of the present invention as defined in the following claims. The specific embodiment or embodiments are, accordingly, to be regarded in an illustrative rather than a restrictive sense.

What is claimed is:

1. An apparatus for providing a filtered-air environment for material handling comprising:
   (a) a frame assembly, the frame assembly defining a material handling area within the frame assembly;
   (b) a filtered-air delivery assembly for delivering filtered air to the material handling area, the filtered-air delivery assembly including:
      (i) an air flow generator assembly for directing air to the material handling area from an area external to the material handling area, and
      (ii) a filter assembly for filtering the air directed from the external area to the material handling area by the air flow generator assembly;
   (c) an air flow redirector configured within the frame assembly for redirecting the air filtered by the filter assembly over the material handling area, the air flow redirector defining at least a pair of work space areas within the material handling area, each work space area having a separate opening for exposing each work space area to the external area such that material is handleable by a person or by a machine in each work space area from the external area through each work space's respective opening.

2. The apparatus of claim 1, wherein the air flow redirector is for redirecting the air filtered by the filter assembly in more than one direction over the material handling area.

3. The apparatus of claim 1, wherein the air flow generator assembly includes a fan assembly for directing the air from the external area at an adjustable speed.

4. The apparatus of claim 1, wherein the air flow generator assembly includes a fan assembly for directing the air from the external area and wherein the air flow redirector includes a diffuser for redirecting the air directed by the fan assembly to the material handling area.

5. The apparatus of claim 1, further comprising a table assembly within the frame assembly, the table assembly having a surface in the material handling area defined by the frame assembly.

6. The apparatus of claim 1, wherein the frame assembly includes a connector surrounding an opening defined by the frame assembly for exposing the material handling area to an other material handling area within an other frame assembly, and wherein the connector is for providing sealed-connection to the other frame assembly.

7. The apparatus of claim 1, wherein the frame assembly includes a transparent panel for viewing the material handling area from an area external to the frame assembly.

8. The apparatus of claim 7, wherein the transparent panel is configured within the frame assembly for providing access to the material handling area.

9. The apparatus of claim 1, wherein the air flow redirector is for redirecting the air filtered by the filter assembly in more than one direction over each of the defined areas.

10. The apparatus of claim 1, wherein the filter assembly includes a first filter for filtering the air from the external area and a second filter for filtering the air filtered by the first filter, and wherein the air flow generator assembly is for directing the air filtered by the first filter to the second filter.

11. The apparatus of claim 10, wherein the second filter is for filtering contaminants in the air filtered by the first filter having a width greater than approximately 0.10 microns.

12. An apparatus for providing a filtered-air environment for material handling comprising:
   (a) a frame assembly, the frame assembly defining a material handling area within the frame assembly, the frame assembly further defining an opening for exposing the material handling area to a first area external to the frame assembly such that material may be handled in the material handling area by a person or by a machine from the first external area, the frame assembly including a transparent panel for viewing the material handling area from the first external area;
   (b) a filtered-air delivery assembly configured within the frame assembly for delivering filtered air to the material handling area, the filtered-air delivery assembly including:
      (i) a fan assembly for directing air to the material handling area from a second area external to the material handling area, and
      (ii) a filter assembly for filtering the air directed from the second external area to the material handling area by the fan assembly; and
   (c) a diffuser configured within the frame assembly for redirecting the air filtered by the filter assembly over the material handling area in more than one direction, the diffuser defining at least a pair of work space areas within the material handling area, each work space area having a separate opening for exposing each work space area to the external area such that material is handleable by a person or by a machine in each work space area from the external area through each work space's respective opening.

13. The apparatus of claim 12, further comprising a table assembly within the frame assembly, the table assembly having a surface in the material handling area defined by the frame assembly.

14. The apparatus of claim 12, wherein the frame assembly includes a connector surrounding an opening defined by the frame assembly for exposing the material handling area to an other material handling area within an other frame assembly, and wherein the connector is for providing sealed-connection to the other frame assembly.

15. The apparatus of claim 12, wherein the transparent panel is configured within the frame assembly for providing access to the material handling area.

16. The apparatus of claim 12, wherein the filter assembly includes a first filter for filtering the air from the external area and a second filter for filtering the air filtered by the first filter, and wherein the air flow generator assembly is for directing the air filtered by the first filter to the second filter.

17. The apparatus of claim 16, wherein the second filter is for filtering contaminants in the air filtered by the first filter having a width greater than approximately 0.10 microns.

18. A system for providing a filtered-air environment for material handling comprising:
(a) a plurality of frame assemblies coupled to one another, each of the frame assemblies defining a material handling area;
(b) a filtered-air delivery assembly for delivering filtered air to the material handling areas defined by the frame assemblies, the filtered-air delivery assembly including:
 (i) an air flow generator assembly for directing air to the material handling area defined by a first frame assembly from an area external to the material handling area defined by the first frame assembly, and
 (ii) a filter assembly for filtering the air directed by the air flow generator assembly from the external area to the material handling area defined by the first frame assembly; and
(c) an air flow redirector within each of the frame assemblies for redirecting the air filtered by the filter assembly over the material handling area defined by each of the frame assemblies wherein each of the air flow redirectors is configured within the frame assemblies to define at least a pair of work areas within each of the material handling areas and redirect the air filtered by the filter assembly over the two defined areas.

19. The system of claim 18, wherein the air flow redirectors redirect the air filtered by the filter assembly in more than one direction over the material handling areas defined by each of the frame assemblies.

20. The system of claim 18, wherein the air flow generator assembly includes a fan assembly for directing the air from the external area at an adjustable speed.

21. The system of claim 18, wherein the air flow generator assembly includes a fan assembly for directing the air from the external area and wherein the air flow redirector includes a diffuser for redirecting the air directed by the fan assembly to the material handling areas defined by each of the frame assemblies.

22. The system of claim 18, further comprising a table assembly within each of the frame assemblies, the table assembly having a surface in each of the material handling areas defined by each of the frame assemblies.

23. The system of claim 18, wherein each of the frame assemblies define an opening for exposing each of the material handling areas defined by each of the frame assemblies to an area external to each of the frame assemblies such that material may be handled in each of the material handling areas defined by each of the frame assemblies by a person or by a machine from the area external to each of the frame assemblies.

24. The system of claim 18, wherein each of the frame assemblies include a connector surrounding openings defined by each of the frame assemblies for exposing a material handling area defined by one of the frame assemblies to the material handling area defined by an adjacent frame assembly, and wherein the connector provides sealed-connection to the adjacent frame assembly.

25. The system of claim 18, wherein each of the frame assemblies include a transparent panel for viewing each of the material handling areas defined by each of the frame assemblies from an area external to each of the frame assemblies.

26. The system of claim 25, wherein the transparent panel is configured within the first frame assembly for providing access to the material handling area defined by the first frame assembly.

27. The system of claim 18, wherein the air flow redirector is for redirecting the air filtered by the filter assembly in more than one direction over each of the defined areas.

28. The system of claim 18, wherein the filter assembly includes a first filter for filtering the air from the external area and a second filter for filtering the air filtered by the first filter, and wherein the air flow generator assembly is for directing the air filtered by the first filter to the second filter.

29. The system of claim 28, wherein the second filter is for filtering contaminants in the air filtered by the first filter having a width greater than approximately 0.10 microns.

* * * * *